(12) United States Patent
Eakin (10) Patent No.: US 9,010,277 B2
(45) Date of Patent: Apr. 21, 2015

(54) METHOD OF A CATTLE FOOT-BATH SYSTEM

(76) Inventor: John W. Eakin, Selah, WA (US)

(*) Notice: Subject to any disclaimer, the term of this patent is extended or adjusted under 35 U.S.C. 154(b) by 689 days.

(21) Appl. No.: 13/136,475

(22) Filed: Aug. 1, 2011

(65) Prior Publication Data

US 2011/0290196 A1    Dec. 1, 2011

Related U.S. Application Data

(63) Continuation of application No. 12/313,601, filed on Nov. 21, 2008, now Pat. No. 7,987,820.

(60) Provisional application No. 61/004,123, filed on Nov. 21, 2007.

(51) Int. Cl.
*A01K 29/00*    (2006.01)
*A61D 11/00*    (2006.01)
*A01K 13/00*    (2006.01)

(52) U.S. Cl.
CPC .............. *A61D 11/00* (2013.01); *A01K 13/001* (2013.01); *A01K 13/003* (2013.01)
USPC ........................................................ 119/673

(58) Field of Classification Search
USPC ........ 119/673, 666, 671; 4/492, 541.4, 541.6, 4/567, 572.1, 586, 625, 622, 671, 675; 601/158, 160, 166, 167
See application file for complete search history.

(56) References Cited

U.S. PATENT DOCUMENTS

| 853,533 | A | 5/1907 | Byrd |
| 983,820 | A | 2/1911 | Goff |
| 1,600,306 | A | 9/1926 | Beddoes et al. |
| 2,870,478 | A | 1/1959 | Schuster |
| 2,956,565 | A | 10/1960 | Anderson |
| 3,208,434 | A | 9/1965 | Barton |
| 4,020,796 | A | 5/1977 | Grifa |
| 4,086,669 | A | 5/1978 | Combis |

(Continued)

FOREIGN PATENT DOCUMENTS

| CN | 1726898 A | 2/2006 |
| EP | 1099373 A1 | 5/2001 |

(Continued)

OTHER PUBLICATIONS

Bulk Bins, Storage and savings in bulk, Nylex Rotomould; Aug. 22, 2006.

(Continued)

*Primary Examiner* — Kristen C Hayes
(74) *Attorney, Agent, or Firm* — Svendsen Legal, LLC.

(57) ABSTRACT

A method for a cattle foot-bath system, specifically adapted to mix and charge foot-bath troughs with repeatably precise quantities of chemical treatments. The system administers a concentrated medicinal agent, such as a bactericide, a fungicide, or a viruscide, for the treatment of cattle feet, and includes a day-tank feed valve, which may be a three-way or interlocked valve, for controlling an infeed flow of the concentrated medicinal agent fed into a day tank, which may be mounted to a portable tote-tank containing the concentrated medicinal agent. A day-tank drain valve controls an outlet flow of the concentrated medicinal agent drained from the day-tank, and the day-tank holds a set quantity of the concentrated medicinal agent. A footbath then receives a quantity of dilution water and the set quantity of the concentrated medicinal agent from the day-tank.

5 Claims, 5 Drawing Sheets

(56) References Cited

U.S. PATENT DOCUMENTS

| | | | |
|---|---|---|---|
| 4,126,104 A | 11/1978 | Overby | |
| 4,317,431 A | 3/1982 | Sparkes | |
| 4,629,087 A | 12/1986 | Lenz | |
| 4,899,789 A | 2/1990 | Carow | |
| 5,058,780 A | 10/1991 | Plester et al. | |
| 5,091,343 A | 2/1992 | Schneider et al. | |
| 5,118,004 A | 6/1992 | Carilli | |
| 5,203,366 A | 4/1993 | Czeck et al. | |
| 5,248,070 A | 9/1993 | Nolte et al. | |
| 5,259,527 A | 11/1993 | Gates | |
| 5,381,923 A | 1/1995 | O'Dea | |
| 5,630,379 A | 5/1997 | Gerk et al. | |
| 5,678,591 A | 10/1997 | Merrifield et al. | |
| 5,769,109 A | 6/1998 | Stanton et al. | |
| 5,774,909 A | 7/1998 | Stable | |
| 5,967,202 A | 10/1999 | Mullen et al. | |
| 6,033,469 A | 3/2000 | Teichert et al. | |
| 6,382,136 B1 | 5/2002 | Bragulla et al. | |
| 6,520,118 B2 | 2/2003 | Swiegers et al. | |
| 6,739,286 B2 * | 5/2004 | Vander Veen | 119/673 |
| 6,742,550 B2 | 6/2004 | Caparros | |
| 6,745,704 B2 | 6/2004 | Carter et al. | |
| 6,948,510 B2 | 9/2005 | King | |
| D610,264 S | 2/2010 | Hess et al. | |
| 7,661,393 B2 | 2/2010 | Torgerson et al. | |
| 7,770,760 B2 | 8/2010 | McGuffey et al. | |
| 7,798,104 B2 * | 9/2010 | Rajkondawar et al. | 119/651 |
| 7,841,299 B2 | 11/2010 | Gerk et al. | |
| 7,980,425 B2 | 7/2011 | Baron et al. | |
| 8,095,997 B2 | 1/2012 | Harris | |
| 8,172,079 B2 | 5/2012 | Greenberg et al. | |
| 2007/0074672 A1 | 4/2007 | Torgerson et al. | |
| 2008/0105581 A1 | 5/2008 | Kondo et al. | |
| 2008/0121189 A1 | 5/2008 | Greeson | |
| 2008/0196674 A1 * | 8/2008 | Buck et al. | 119/673 |
| 2008/0216762 A1 * | 9/2008 | Gerk et al. | 119/673 |
| 2009/0027995 A1 | 1/2009 | Bachman et al. | |
| 2009/0107414 A1 | 4/2009 | Vecchia | |
| 2011/0100869 A1 | 5/2011 | Spann et al. | |

FOREIGN PATENT DOCUMENTS

| | | | |
|---|---|---|---|
| EP | 1238581 A2 | 11/2002 | |
| EP | 1238581 A3 | 11/2002 | |
| FR | 2609361 A1 | 7/1988 | |
| FR | 2841142 A1 | 12/2003 | |
| GB | 1222078 A | 2/1971 | |
| GB | 1506434 A | 4/1978 | |
| GB | 1551144 A | 8/1979 | |
| GB | 1595893 A | 8/1981 | |
| GB | 2311202 A | 9/1997 | |
| JP | 2005162290 | 6/2005 | |
| NL | 1009895 C1 | 2/2000 | |
| WO | 9301763 | 4/1993 | |
| WO | 2004033761 A | 4/2004 | |
| WO | 2007058481 A1 | 5/2007 | |
| WO | 2010069328 A1 | 6/2010 | |

OTHER PUBLICATIONS

Buyer's Guide: Intermediate Bulk Containers and Bins; Snyder Industries, Inc Mar. 8, 2007.
Nylex Bulkibox, Supertanks; RJ Cox Engineering Dec. 31, 2009.
Milk, How Products Are Made, vol. 4,. Advameg, Inc.; Advameg, Inc. May. 17, 2012.
Day Tank Definition, Hu Mimi; May. 17, 2012.
Assmann Polyethylene Tanks Brochure; Assmann Corporation of America Oct. 28, 2005.
Force Flow Site Map; Force Flow Chemical Monitoring Systems May. 17, 2012.
Our PIG Poly Containment Units, The Big Pigalog, 2012 Buying Guide; New Pig Corporation May. 18, 2012.
Justrite Master Catalog 2003-2004, Safety and Storage Solutions; Justrite Manufacturing Company Oct. 3, 2003.
PIG Poly IBC Containment Unit, Matthews An Authorized New Pig Distributor, Catalog; Matthews Austalasia Ltd. Apr. 7, 2005.
IBS Containment & Dispensing Station, Little Giant, (online archive); Brennan Equipment andManufacturing Company Dec. 16, 2004.
Little Giant Catalog, Industrial Floor Trucks and Carts, Brennan Equipment and Manufacturing Company, 2004; Brennan Equipment and Manufacturing Company Jun. 10, 2004.
Poly IBC Containment Unit (p. 367), The Big Pigalog, 2005 Buying Guide; New Pig Corporation Dec. 31, 2005.
Containment Unit for IBC tanks (p. 377), The Big Pigalog, 2007 Buying Guide New Pig Corporation Dec. 31, 2007.
Containment Unit for IBC tanks (p. 69), Pig Facility Saver, Sep. 2002; New Pig Corporation Sep. 30, 2002.
Containment Unit for IBC tanks (p. 237), New Pig: Pig Leak and Spill Products, Jan. 1998; New Pig Corporation Jan. 31, 1998.
Double duty Caddy & Outdoor model; Justrite Manufacturing Company Sep. 29, 2010.
Dispensing Shelf & Open-view Sump; Justrite Manufacturing Company Sep. 28, 2010.
Controls for containment: work with containment/pumping specialist BakerCorp highlights growing capabilities of Controls Inc. (Industry News); Diesel Progress North American Edition; Diesel & Gas Turbine Publications, Inc. Nov. 1, 2008.
Don't allow lameness to grind down beef profits.; Farmers Weekly; Reed Business Information Limited Nov. 17, 2006.
HEALTH: Role of footbaths in battle to control digital dermatitis; Dairy Farmer; CMP Information Ltd Nov. 16, 2005.
A double wall "day tank" system that provides primary and secondary containment in one integral space-saving unit is offered by Assmann Corp., Dairy Foods; Gale Group Inc Feb. 1, 2003.
FSI International Announces $11 Million Order For Chemical Management Systems; 06:48; PR Newswire Sep. 27, 1996.
Oxygenated feedwater treatment proves worth In a departure from traditional chemical-treatment practice, OT methodology features maintenance . . .; Power Magazine; McGraw-Hill, Inc Oct. 1, 1994.
Compact multi-function pump controllers. (plant and equipment)(Pump Engineering Co.)(Brief article); Food Trade Review; Gale Group Inc Feb. 1, 2007.
Chapter 35—Chemical Feed Systems, Handbook of Industrial Water Treatment; GE Power & Water Jul. 25, 2008.
Submittal Manual: Day Tank-TRS Series; Tramont Corporation Jul. 2, 2007.
Engineered Feed Systems CARUSMATIC, Selection and Application Guide, (Series 2000), Rev 5.00; Carus Chemical Company Dec. 4, 2004.
Chemical Feed Systems, Bulletin FDP/CFS-04; Neptune Chemical Pump Co. Inc. Nov. 13, 2006.
Float Control Boxes, Price List; Kisco Sales, Inc. Nov. 15, 1996.
Pharmaceutical Process Validation: An International Third Edition, Revised and Expanded, Drugs And The Pharmaceutical Sciences vol. 125 (RA Nash, AH Wachter, eds.); Marcel Dekker, Inc. Dec. 31, 2003.
Recommended Standards for Water Works, 2007 Edition, Policies for the Review and Approval of Plans and Specifications for Public Water Supplies, Great Lakes—Upper Mississippi River Board of State and Provincial Public Health and Environmental Managaers; Health Research, Inc Sep. 22, 2008.
Chemical Safety Control Strategy for Critical Chemical Feed Systems, Section 6.1.3, Water, Wastewater, & Wetlands, Regulations & Standards; Massachusetts Department of Environmental Protection Dec. 1, 2009.
Code of Practice on Technical Aspects of Fluoridation of Water Supplies; Dec. 31, 2004.
Texas Flouridation Project, Operator Manual on Flouridation Procedures. Fluoridation Procedures; Texas Department of Health Feb. 28, 2007.
Stacked Discharge Drain Hose & Vent Hose Assemblies (347747 & 347748); Snyderindustries, Inc Aug. 19, 2002.
The Use of Potassium Permanganate in Fish Ponds, Andrew M. Lazur (Document FA23); Institute of Food and Agricultural Sciences, University of Florida May. 22, 2012.

(56) References Cited

OTHER PUBLICATIONS

Texas Fluoridation Project, Flourosilic AcidSystem, 100 Gallon Bulk, Open Top Tank Containment Pressurized Injection Type; Texas Department of State Health Services Feb. 19, 2007.

Equipment Specification, Fluorosilicic Acid System, ES-1, Revision 13; Texas Department of State Health Services Oct. 18, 2005.

Texas Fluoridation Project, Typical Liquid Feed System, Carboy Storage; Texas Department of State Health Services Feb. 19, 2007.

Texas Fluoridation Project, Typical Liquid Feed System, Bulk Storage; Texas Department of State Health Services Feb. 19, 2007.

Fluoridation System Technical Requirements, Fluorosilic Acid System, TR-1, Revision 1; Texas Department of State Health Services May. 9, 2005.

Drum Management System For Storage and Dispensing, Gator Drum Management System, Modules combine efficient drum storage, positive spill control, and safe liquid dispensing; Justrite Manufacturing Company Mar. 14, 2006.

Environmental Products, Spill Containment Caddy For Drum Handling and Dispensing, Gator Spill Containment Caddy; Justrite Manufacturing Company Mar. 14, 2006.

1 Photo—Specialty Sales, Llc system—Bakersfield, California Feb. 2, 2007.

2 Photos—Specialty Sales, LLC system—Tulare, California Apr. 2007.

2 Photos—Eakin Enterprises, Inc. system—Boardman, Oregon 2005.

15 Photos—Eakin Enterprises, Inc. system—Tulare, California.

* cited by examiner

METHOD OF A CATTLE FOOT-BATH SYSTEM

This Non-Provisional Utility Application claims priority to Non-Provisional Utility patent application Ser. No. 12/313,601, as filed Nov. 21, 2008, now U.S. Pat. No. 7,987,820 and based upon Provisional Utility Application 60/004,125, as filed Nov. 21, 2007.

FIELD OF INVENTION

The present invention generally relates to a method of a cattle foot-bath system, which is specifically adapted to mix and charge foot-bath troughs with precise quantities of chemical treatments.

BACKGROUND

Foot-baths are a valuable tool for the management of cattle, especially in larger scale dairy and feedlot operations. Their use can clean the feet or hooves of the cattle, killing bacteria, viruses and fungi, and generally helping in the heath and hardening of the hooves. When used to deliver the appropriate treatment, the use of foot-baths helps to reduce lameness associated with foot-rot, foot-and-mouth disease, heel erosion and digital dermatitis. For modern dairies, the foot-bath is typically included in the design of cattle housing, generally near the exit from a milking parlor, in a position through which cows normally move, or in an adjacent area through which cows can be diverted when necessary, with minimal disturbance to their normal routine. Ideally, two foot-baths should be used in tandem, the first containing water to clean the feet, and the second containing the suitable treatment chemical.

Conventional foot-bath systems are maintained and operated by on-site workers and personnel, who simply fill an empty foot-bath with a concentrate to a predetermined level, and then top off the foot-bath with water. This conventional technique sometimes results in foot-bath solutions that are too weak for effective treatment, or are too strong and may injure the feet of the cattle. A known improvement to this conventional, manual method includes the automated, metered control of the concentrate into the foot-bath. Such automatically metered systems have the potential to reduce the accurate delivery problems often encountered with the manual method. However, these automated system either require some sort of remote monitoring or feedback to a controller, or requires a user to program the controller to precisely follow the processing of cattle.

An economical and foolproof method for the operation of a cattle foot-bath is needed that provides the foot-bath with an accurately measured hoof treatment solution as needed for the particular cattle handling operation, without programming an expensive and difficult to maintain controller or some other automated, fallible feed-system apparatus. A detailed understanding of the present invention's features will be had upon reference to the following description, when read in conjunction with the accompanying drawings.

DESCRIPTION OF PREFERRED EMBODIMENTS

Figure 1:
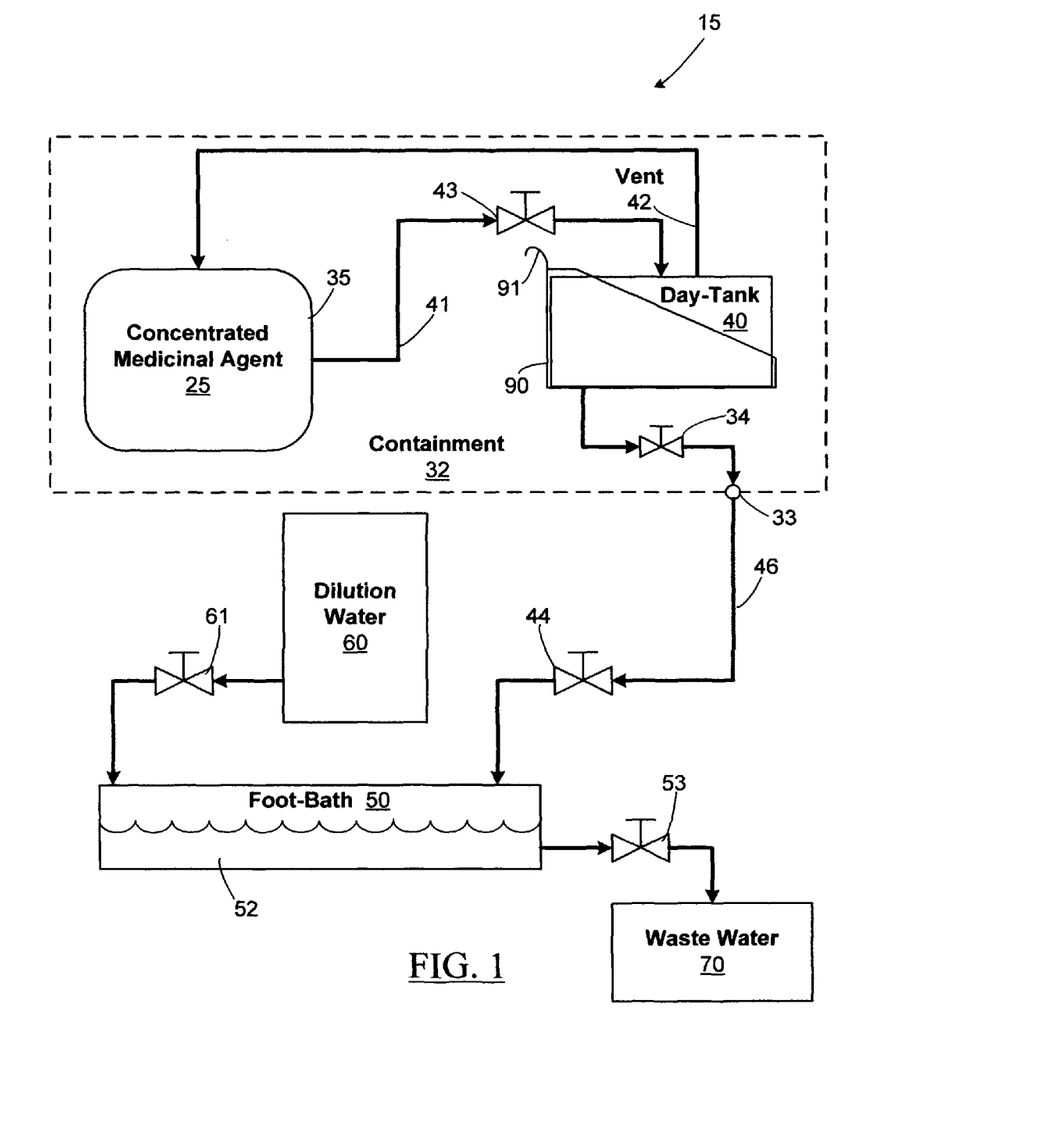
FIG. 1 is a schematic view of a cattle foot-bath system, according to a preferred embodiment of the present invention.

Preferred embodiments of the present invention are shown in FIGS. 1 through 3B, directed to a cattle foot-bath system 15. The cattle foot-bath system is well suited for the treatment and cleaning of feet or hooves of the cattle. As shown in FIG. 1, the cattle foot-bath system 15 includes the semi-automated delivery of a concentrated medicinal agent 25, the medicinal agent selected for the treatment of cattle feet.

The concentrated medicinal agent 25 may be any medically active bactericide, fungicide, or viruscide, desired for use in a foot bath 50 with the cattle foot-bath system 15 of the present invention. Preferably, the concentrated medicinal agent 25 is a concentrated "formalin" solution, which is formaldehyde in a water solution. Formalin is especially useful in the preventive treatment of lameness associated with foot rot, and related diseases caused by bacterial infections of the hooves. The formalin concentrate is most preferably contained in a portable tank, conventionally referred to as a "tote-tank" 35. Because the tote-tank contains a concentrated solution of what may be an environmentally sensitive substance, the tote-tank is preferably placed within a containment 32, as shown in FIGS. 1 through 3B. The containment prevents contamination of the environment external to the containment, if the tote-tank leaks.

The concentrated medicinal agent 25 is preferably fed through the containment 32 at a containment penetration 33, as shown in FIGS. 1 through 3B. Most preferably, the feed is also controlled with a feed shut-off valve 34, which acts as a safety valve to prevent leakage downstream of the containment.

As shown in FIGS. 1 through 3B, the concentrated medicinal agent 25 is fed into a day-tank 40. The day-tank holds the set quantity of the concentrated medicinal agent, providing an exact and consistent quantity for use with the foot-bath 50. The day-tank is sized to receive and precisely measure a quantity of the concentrated medicinal agent. Preferably, the day-tank contains five U.S. gallons, when filled, but could hold more or less material, depending on the activity and strength of the concentrated medicinal agent, the final volume of the foot-bath, and ultimate desired concentration of the resultant mixture within the foot-bath.

For the most preferred concentrated medicinal agent 25, a standard formalin concentrate, of 37% formaldehyde in water by volume is employed. After filling, the day-tank feed valve 43 is closed, and the day-tank 40 is ready for delivery to the foot-bath 50. The filled day-tank quantity of concentrate is mixed in the foot-bath 50 with a set quantity of a dilution water 60. Preferably, for the five-gallon day-tank, with the 37% solution, forty-five U.S. gallons of the dilution water are employed. This results in a volume of fifty U.S. gallons of a working mixture 52 within the foot-bath having a concentration of 3.7% formaldehyde in water by volume, or one-tenth of the original concentration. The dilution water may be any source of pure or recycled water for use by the cattle.

Figure 3A:
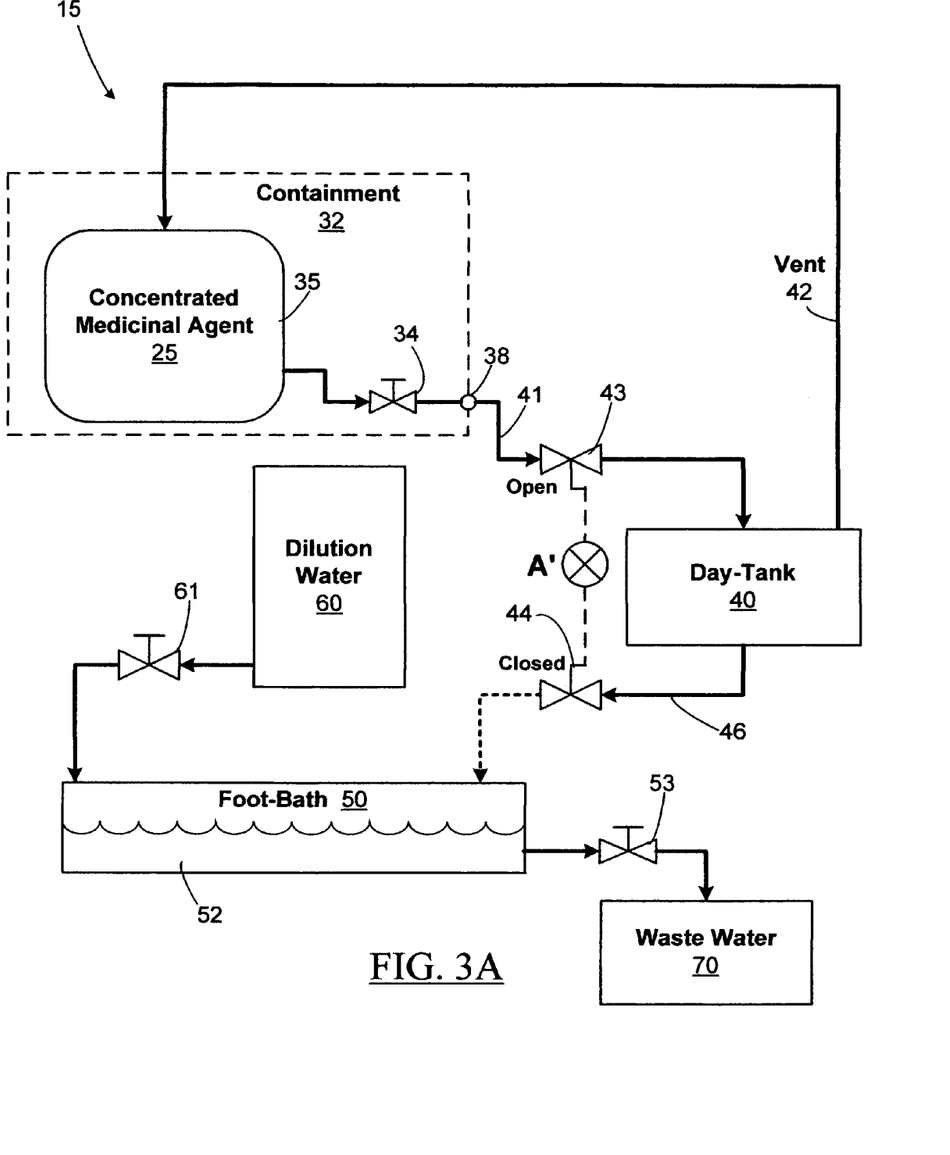
FIG. 3A is a schematic view of a cattle foot-bath system, according to a preferred embodiment of the present invention.
Figure 3B:
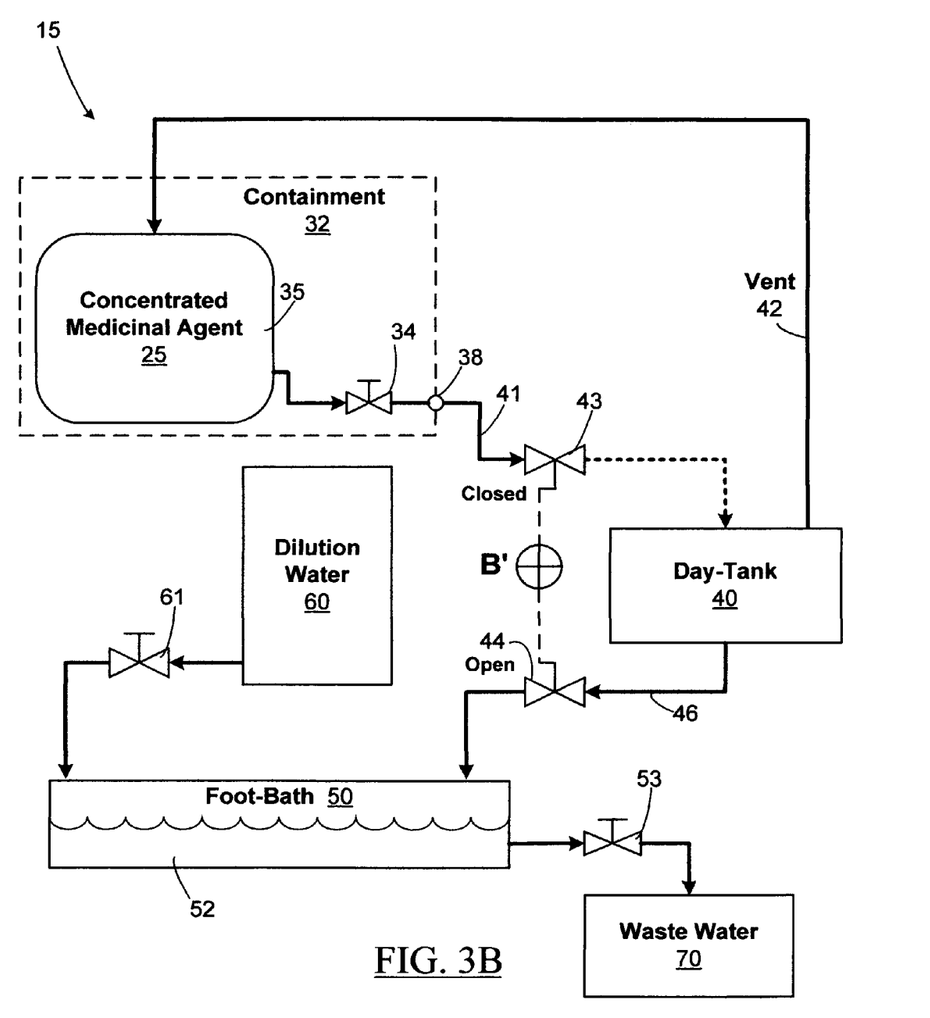
FIG. 3B is a schematic view of a cattle foot-bath system, according to a preferred embodiment of the present invention.

Specifically, as shown in FIGS. 1, 3A and 3B, a day-tank feed valve 43 is employed to control an infeed flow of the concentrated medicinal agent 25 into the day tank 40, through a concentrated feed-pipe 41. After the day-tank is filled, the day-tank feed valve is closed and a day-tank drain valve 44 is opened. The day-tank drain valve controls an outlet flow of the concentrated medicinal agent drained from the day-tank, through a day-tank drain pipe 46.

As shown in FIGS. 1 through 3B, the cattle foot-bath system 15 preferably includes a vent 42 connecting the day-tank 40 to the concentrated medicinal agent 25 this component recycles any vapors emitted from the day-tank, especially during filling, and if the day-tank is overfilled, the overflow is directed back to the tote-tank of concentrated medicinal agent.

Preferably, prior to the opening of the day-tank drain valve 44, to fill the foot-bath 50, the foot-bath is partially filled with the dilution water 60, by the opening of a dilution water valve 61. This may be additionally accomplished with either a metered valve, tank graduations on the container or tank holding the dilution water, or a mark on the foot-bath. Alternatively, the contents of the day-tank can be released into the foot-bath by opening the day-tank drain valve and the dilution water then added to "top-off" the foot-bath at a set fill point. With the pre-measured contents of the day-tank and the added dilution water, the foot-bath contains the working mixture 52, which includes the concentrated of the medicinal agent diluted to desired, effective level. This process for the cattle foot-bath system 15 is repeatable with the same exact results, without requiring exacting volumetric measurements or oversight by technically skilled personnel.

Preferably, the foot bath 50 is conventionally sized with capacity of fifty U.S. gallons. Typically, the foot-bath has a length of approximately six feet in and is approximately three feet in width. The working mixture 52 should fill the foot-bath to a depth of approximately four to six inches. The foot-bath can be located at the exit lanes from a milking parlor, when employed for use in a dairy operation.

Typically, the foot-bath 50 is drained and recharged with fresh working mixture 52 on a daily basis. To drain the previously mixed, used or spent working mixture 52 from the foot-bath, a foot-bath drain valve 53 is employed, as located in FIGS. 1 through 3B. The working mixture is transferred as a waste water 70, which may be any appropriate tank, lagoon or pond. The formalin active ingredient of the preferred concentrated medicinal agent 25 is converted into a benign by-product quickly, attributable to degradation from heat, sunlight and cattle urine. The waste water may be reclaimed for other uses in the farm, ranch or dairy employing the cattle foot-bath system 15.

Figure 2A:
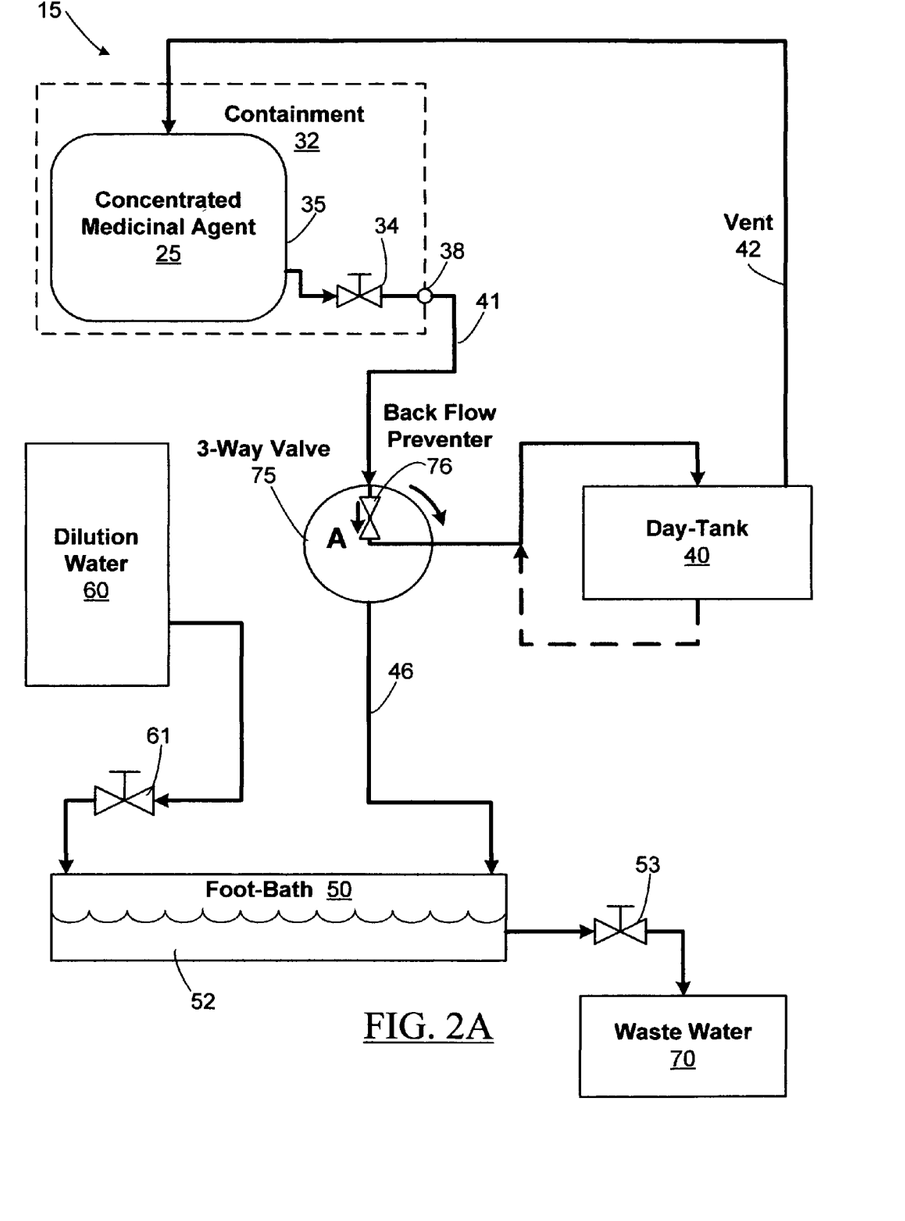
FIG. 2A is a schematic view of a cattle foot-bath system, according to a preferred embodiment of the present invention.
Figure 2B:
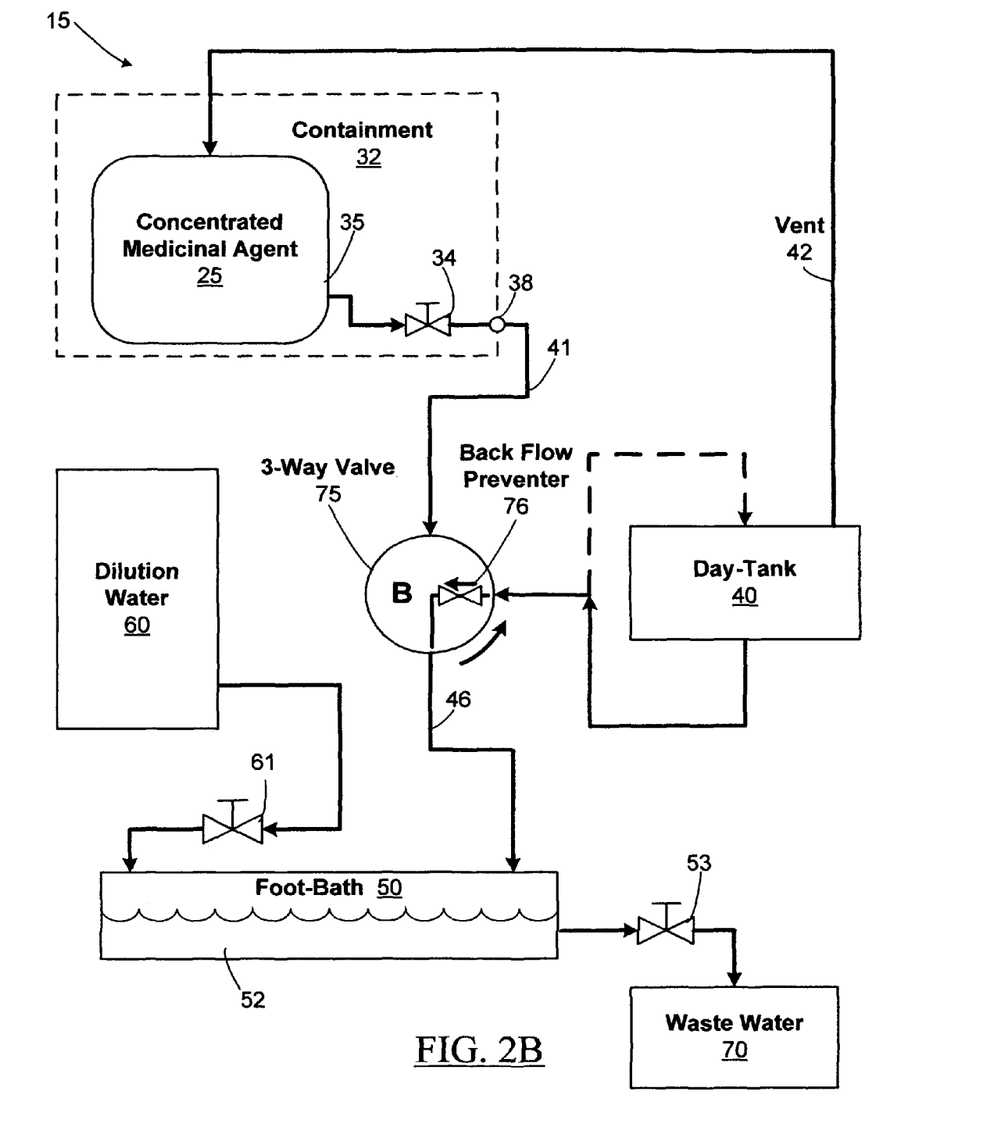
FIG. 2B is a schematic view of a cattle foot-bath system, according to a preferred embodiment of the present invention.

An alternative embodiment of the cattle foot-bath system 15 is shown in FIGS. 2A and 2B, employing a three-way valve 75. The three-way valve is preferably a conventional, three-way diverter type of valve, with an inlet and a valve with the ability to select one of two outlets. The three-way valve replaces the function of the day-tank feed valve 43 and the day-tank drain valve 44. The three-way valve also assures that the day-tank 40 is used as a measuring tank, and not drained as it fills, or simply employed as a flow-through passage from the tote-tank to the foot-bath 50. FIG. 2A shows the three-way valve in a day-tank fill position A, which serves to fill the day-tank, while preventing the day-tank from draining into the foot-bath. FIG. 2B shows the three-way valve in a day-tank drain position B, which serves to drain the day-tank, while preventing the day-tank from filling with the concentrated medicinal agent 25.

Additionally, the three-way valve 75 may include a back-flow preventer 76. The back-flow preventer is a standard flow control device that halts the reverse flow of liquid through the valve. In position A, as shown in FIG. 2A, the back-flow preventer stops the flow of concentrated medicinal agent 25, back to the tote-tank 35 from the day-tank 40. In position B, as shown in FIG. 2B, the back-flow preventer stops the flow of concentrated medicinal agent 25, back to the day-tank 40 from the foot-bath 50.

In an additional alternative embodiment of the cattle foot-bath system 15, a valve interlock 80 may be included, to further improve the reliability of operation for the cattle foot-bath system 15. As with the three-way valve 75, the valve interlock assures that the day-tank 40 is used as a measuring tank, and not drained as it fills, or simply employed as a flow-through passage to the foot-bath 50. FIG. 3A shows the valve interlock in a day-tank fill position A', which serves to open the day-tank feed valve 43, while closing the day-tank drain valve 44. FIG. 3B shows the valve interlock in a day-tank drain position B', which serves to drain the day-tank, while preventing the day-tank from filling with the concentrated medicinal agent 25.

The valve interlock 80 may be a mechanical or electrical device that prevents flow through the day-tank drain valve 44, while the day-tank feed valve 43 is in the open position, and conversely prevents flow through the day-tank feed valve, while the day-tank drain valve is in the open position. An interlock bar can be employed to serve as the valve interlock, or a solenoid powered electro-mechanical interlock can be utilized, for example.

For convenience in operation of the cattle foot-bath system 15, the day-tank 40 may be mounted directly to the tote tank of the concentrated medicinal agent 25, with a day-tank tray 90, as shown in FIG. 1. With the day tank tray attachment to the tote tank, the day tank can be placed within the containment 42, or straddle the containment as preferred. If the day-tank is placed within the containment, the containment penetration 33 is placed on the outflow from the day-tank, in the day-tank drain line to the foot bath 50.

The method of the cattle foot-bath system 15 includes opening the day-tank feed valve 43, the day-tank feed valve for controlling the infeed flow of the concentrated medicinal agent 25 into the day-tank 40. The concentrated medicinal agent infeeds into the day-tank, from the container of the concentrated medicinal agent, which is most preferably a portable tank, referred to herein as the tote-tank 35. The day-tank holds the set quantity of the concentrated medicinal agent.

The day-tank feed valve 43 is then closed and the day-tank drain valve 44 opened, the day-tank drain valve for controlling the outlet flow of the concentrated medicinal agent 25, as drained from the day-tank 40. The day-tank is drained into the footbath 50, which receives a quantity of dilution water and the set quantity of the concentrated medicinal agent from the day-tank.

The day-tank drain valve 44 is then closed and the quantity of the dilution water 60 and the set quantity of the concentrated medicinal agent 25 from the day-tank 40 are mixed in the footbath 50, to formulate a repeatably precise concentration of the diluted medicinal agent, also referred to herein as the working mixture 52.

The day-tank tray 90 is mounted to the portable tank 35 or tote-tank, with the portable tank containing the concentrated medicinal agent 25, and the day-tank tray receiving the day-tank 40.

Additionally, the day-tank feed valve 43 can be interlocked with the day-tank drain valve 44, to prevent the day-tank feed valve and the day-tank drain valve from both being open at the same time.

In preferred alternative additional steps of method of the present invention, the concentrated feed pipe 41 can be connected to the container 35 of the concentrated medicinal agent 25, and the tank 35 of concentrated medicinal agent 25 surrounded with a containment 32. Most preferably, the feed is controlled with a feed shut-off valve 34, which acts as a safety valve to prevent leakage outside of or downstream of the containment.

In further preferred alternative additional steps of method of the present invention, the flow of the concentrated medicinal agent 25 can be selectively routed through a three way valve 75, either into the day-tank 40 from the concentrated feed pipe 41, or selectively routed through the three way valve out of the day-tank through the day-tank drain pipe 46 to the foot-bath 50.

Having now described the present invention, to those skilled in the art to which it pertains, it may become apparent that the need to make modifications without deviating from the intention of the invention. In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

What is claimed is:

1. A cattle foot-bath method comprising the steps of:
    a) opening a day-tank feed valve, the day-tank feed valve controlling an infeed flow of a concentrated medicinal agent into a day-tank;
    b) infeeding the concentrated medicinal agent into the day-tank, from a container of the concentrated medicinal agent, the day-tank holding a set quantity of the concentrated medicinal agent;
    c) closing the day-tank feed valve;
    d) opening a day-tank drain valve, the day-tank drain valve for controlling an outlet flow of the concentrated medicinal agent drained from the day-tank;
    e) draining the day-tank into a foot-bath receiving a quantity of a dilution water and the set quantity of the concentrated medicinal agent from the day-tank;
    f) closing the day-tank drain valve;
    g) mixing a quantity of the dilution water and the set quantity of the concentrated medicinal agent from the day-tank in the foot-bath;
    h) formulating a repeatably precise concentration of a diluted medicinal agent;
    i) mounting a day-tank tray to a portable tank, with the portable tank containing the concentrated medicinal agent, and the day-tank tray receiving the day-tank.

2. The cattle foot-bath method of claim 1, additionally including the step of:
    j) interlocking the day-tank feed valve and the day-tank drain valve to prevent the day-tank feed valve and the day-tank drain valve from both being open at the same time.

3. The cattle foot-bath method of claim 1, additionally including the steps of:
    j) connecting a concentrated feed pipe to the container of the concentrated medicinal agent;
    k) surrounding the container of concentrated medicinal agent with a containment; and
    l) passing the concentrated feed pipe through the containment, proximate to a safety valve.

4. The cattle foot-bath method of claim 1, additionally including the step of:
    j) selectively routing flow of the concentrated medicinal agent through a three way valve, either into the day-tank from a concentrated feed pipe, or selectively routing flow of the concentrated medicinal agent through the three way valve out of the day-tank through a day-tank drain pipe to the foot-bath.

5. The cattle foot-bath method of claim 1, additionally including the steps of:
    j) surrounding the container of concentrated medicinal agent with a containment;
    k) receiving the day tank into the day-tank tray;
    l) draining the day-tank with a day-tank drain pipe connected to the day-tank; and
    m) passing the day-tank drain pipe through the containment proximate to a safety valve.

* * * * *